United States Patent [19]

Ota et al.

[11] Patent Number: 5,483,038
[45] Date of Patent: Jan. 9, 1996

[54] METHOD OF WORKING DIAMOND WITH ULTRAVIOLET LIGHT

[75] Inventors: Nobuhiro Ota; Katsuko Harano; Naoji Fujimori, all of Hyogo, Japan

[73] Assignee: Sumitomo Electric Industries, Ltd., Osaka, Japan

[21] Appl. No.: 50,639

[22] Filed: Apr. 22, 1993

[30] Foreign Application Priority Data

Apr. 23, 1992 [JP] Japan ................................. 4-104483
Mar. 10, 1993 [JP] Japan ................................. 5-048452

[51] Int. Cl.$^6$ ............................ B23K 26/00; B23K 26/06
[52] U.S. Cl. ............................ 219/121.69; 219/121.68; 219/121.73
[58] Field of Search ................................. 156/603, 643; 437/173; 148/DIG. 93; 219/121.84, 121.68, 121.69, 121.73, 121.75, 121.74, 121.6, 121.72; 427/586

[56] References Cited

U.S. PATENT DOCUMENTS

| | | | |
|---|---|---|---|
| 3,527,198 | 9/1970 | Takaoka | 219/121.84 |
| 4,401,876 | 8/1983 | Cooper | 219/121.69 |
| 4,467,172 | 8/1984 | Ehrenwald et al. | 219/121.68 |
| 4,480,169 | 10/1984 | Macken | 219/121.74 |
| 4,546,231 | 10/1985 | Gresser et al. | 219/121.72 |
| 4,670,063 | 6/1987 | Schachameyer et al. | 156/643 |
| 4,766,009 | 8/1988 | Imura et al. | 156/643 |
| 4,861,421 | 8/1989 | Bienstock | 156/643 |
| 4,970,366 | 11/1990 | Imatou et al. | 219/121.68 |
| 5,012,067 | 4/1991 | Sato et al. | 219/121.72 |
| 5,138,130 | 8/1992 | Islam et al. | 219/121.6 |
| 5,149,938 | 9/1992 | Winston et al. | 219/121.69 |
| 5,194,711 | 3/1993 | Gaukroger | 219/121.75 |
| 5,328,715 | 7/1994 | Iacovangelo et al. | 156/643 |
| 5,387,443 | 2/1995 | Ota et al. | 427/586 |
| 5,410,125 | 4/1995 | Winston et al. | 219/121.69 |

FOREIGN PATENT DOCUMENTS 3-264181  11/1991  Japan.
2248575    4/1992  United Kingdom.

OTHER PUBLICATIONS

Patent Abstracts of Japan, vol. 007, No. 187 (M-236) 16 Aug. 1993 & JP-a-58 086 924 (Sumitomo Denki Kogyo KK) 24 May 1993 * abstract *.

*Primary Examiner*—Geoffrey S. Evans
*Attorney, Agent, or Firm*—Cushman Darby & Cushman

[57] ABSTRACT

Diamond is subjected to working such as smoothing or cutting by irradiation of light having a wavelength in the range of 190 nm to 360 nm to the surface of the diamond. The energy density of the incident light, the divergent angle of the light beam and the half-width of spectrum of the light are specified. The light beam is converged by a cylindrical lens. Moreover, the working is conducted in a specified material, whereby the flatness of the worked face and the working speed are improved.

25 Claims, 2 Drawing Sheets

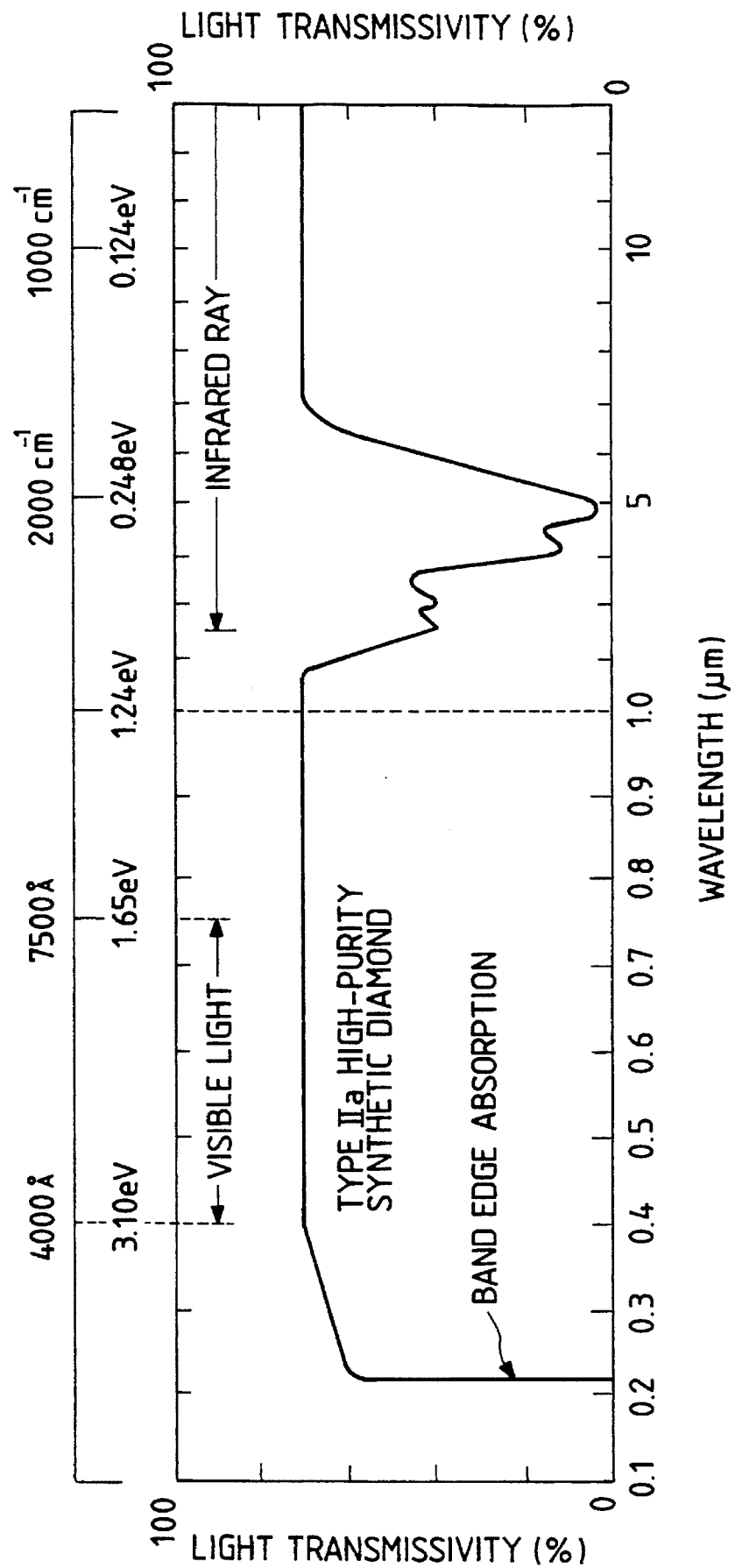

METHOD OF WORKING DIAMOND WITH ULTRAVIOLET LIGHT

BACKGROUND OF THE INVENTION

This invention relates to a method of working single-crystal or polycrystalline diamond used in a tool, a heat sink or the like, and provides a working method in which diamond cutting and surface smoothing of diamond can be performed with high efficiency and high precision.

Diamond has the highest hardness among all the substances, so that diamond is extremely difficult to be worked. In the case of single-crystal diamond, data regarding the surface orientation and direction in which the working can be relatively easily conducted are known to some degree. Though in the limited range, in accordance with the data, the grind working is conventionally conducted by scaife abrasion. However, in the case of polycrystalline diamond, the diamond particle constituents are orientated in any directions. In this case, the scaife abrasion or the like may be conducted, but it is difficult to smooth the surface.

On the other hand, regarding the cutting, a discharge machining can be applied to a sintered body which is sintered by using a conductive sintering assistant. However, this method cannot be applied to diamond having no electric conductivity, such as single-crystal diamond, sintered diamond which is sintered by using a nonconductive sintering assistant, and vapor-phase synthetic diamond. Conventionally, therefore, the cutting work is thermally performed using laser such as $CO_2$ laser, CO laser, and YAG laser. However, since diamond is transparent to such laser light, this method has a disadvantage in that the utilization efficiency of optical energy is poor, that is, the working efficiency is poor.

The working is performed by irradiating diamond with infrared light having a wavelength of 1 µm or more to heat diamond, so as to fuse, graphitize and oxidize the diamond, and hence portions in the peripheral of the area to be worked are thermally affected to be degraded. Moreover, since the cutting margin should be set large, there arises a serious problem in that the working precision is degraded.

When the cutting work is performed with laser in a conventional manner, peripheral portions of diamond are degraded by heat. Therefore, the degraded peripheral portions are required to be mechanically removed by scaife abrasion or another method. In the case where laser is used for smoothing the surface, the laser is transmitted to reach the inside and base members which must not be worked, thereby causing an adverse influence to be exerted, in addition to the deterioration of the peripheral portions of diamond by heat. In order to avoid these adverse influences, it is required to provide a countermeasure by which the incident angle of laser is restricted so that only the surface is illuminated, or which suppresses the scattering of laser at the surface.

In the case of performing the grinding work by scaife abrasion or another method, the abrasion is conducted by heat. Therefore, diamond is heated to several hundreds of degrees Celsius by frictional heat, resulting in that the diamond body is inevitably adversely affected. It is known that diamond in the air starts at about 600° C. to be graphitized and oxidized, to deteriorate. In the case of scaife abrasion, moreover, it is difficult to fix a work piece. If the work piece is too small or has an indefinite form, the abrasion for such a work piece is extremely difficult to conduct, and thus the operability is poor. Sometimes, there occurs a case where the work cannot be performed. Moreover, the work by scaife abrasion has a problem in that it necessitates much time.

SUMMARY OF THE INVENTION

The object of the present invention is to provide a novel method of working diamond by which diamond is cut or ground and the surface thereof is smoothed without affecting the diamond itself to be worked, and in which the working speed can be improved.

The present invention is a diamond working method characterized in that the surface of diamond is irradiated with light having a wavelength of 360 nm or less, or having a wavelength in the range of 190 nm to 360 nm. It is preferable that the energy density of the irradiation light is in the range of 10 W/cm$^2$ to $10^{11}$ W/cm$^2$. An excellent working result can be attained by using pulsed laser light and setting the energy density per one pulse of the laser light to be in the range of $10^{-1}$ J/cm$^2$ to $10^6$ J/cm$^2$ and more preferably, between 10 J/cm$^2$ to $10^6$ J/cm$^2$.

Moreover, the divergent angle of the laser light when oscillated from a laser oscillator is set from $10^{-2}$ mrad to $5 \times 10^{-1}$ mrad. The half-width of the oscillation spectrum of the laser light is not less than $10^{-4}$ nm and less than 1 nm. It is desirable that a variation in energy distribution in a beam section of the laser light be 10% or less. An excellent working result can be obtained by converging the pulsed laser light with a cylindrical lens or a cylindrical mirror.

In another aspect, the present invention is a diamond working method characterized in that a diamond surface is partly covered with a powder particle or liquid, and then by irradiating the surface with light having a wavelength in the range of 190 nm to 360 nm, whereby the diamond portion which is exposed from the particle or liquid layer is ground. Another method of the invention is characterized in that diamond is placed in a specified liquid, and then irradiated with light having a wavelength in the range of 190 nm to 360 run, whereby the diamond is worked.

BRIEF DESCRIPTION OF THE DRAWINGS

FIG. 3 shows an absorption spectrum of type IIa diamond of high purity.

DETAILED DESCRIPTION OF THE INVENTION

Figure 1:
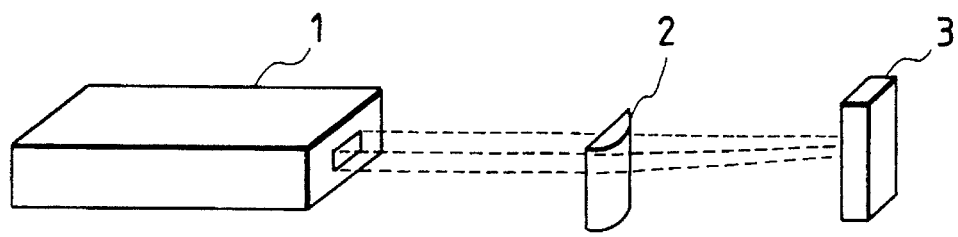
FIG. 1 is a diagram showing the concept of an example of an apparatus for performing the method of the invention.

High-purity type IIa diamond has the light absorption characteristics shown as an absorption curve in FIG. 3. From this curve, it is seen that light absorption is in the range where the wavelength is 400 nm or less. The amount of absorption is gradually increased in the wavelength range of 400 nm to 240 nm. The absorption is steeply increased at the wavelength of 220 nm or less so that the light is completely absorbed. Regarding type Ia or type Ib diamond which is a general type of normal vapor-phase synthetic diamond, or of natural or artificial diamond, large absorption exists in the ultraviolet range. The light in this range is ultraviolet light, and it is known that, when ultraviolet light is absorbed into a substance, it mainly participates in the excitation of electrons at chemical bonds.

In other words, it is considered that, incident light having a wavelength of 400 nm or less produces some effects on the carbon-carbon bonds which constitute diamond, thereby changing the property of the bonds. Under general understanding in the field, however, it is difficult to think out a method of working a substance such as diamond in which elements are three-dimensionally and extremely strongly combined with each other by covalent bonds, by ultraviolet light exhibiting effects other than the thermal effect.

The present inventors have intensively studied the reaction of light with diamond. As the result of the study, the inventors have found that diamond can be worked without causing any damage and with high efficiency by the irradiation of light having a wavelength of 360 nm or less. Particularly, it has been also found that light having a wavelength in the range of 190 nm to 360 nm is effective in the working of diamond, whereby the present invention is accomplished. In the above wavelength range, 100% of the light is absorbed only by the surface layer of the diamond, so that it will not permeate into the inside. Furthermore, it has been found that, also in type IIa diamond, multiphoton absorption occurs and a large part of the incident light is absorbed at the surface.

Therefore, the light energy is efficiently concentrated at a portion to be worked, so that the working can be performed with high efficiency and at a high speed. In the case of smoothing the surface, the energy can be concentrated only at the surface, so that no influence is exerted on other portions, thereby reducing the incident angle dependency.

Useful light sources for the working include excimer lasers of $F_2$, ArF, KrCl, KrF, XeCl, $N_2$ and XeF, a mercury lamp, and synchrotron orbital radiation (SOR) light. However, the light sources are not limited to these. These excimer lasers have their specific oscillation wavelengths of 157, 193, 222, 248, 308, 337 and 353 nm, respectively. In contrast, the mercury lamp and the SOR have continuous wavelength bands. The light of continuous spectrum may be used for the irradiation, and alternatively, the wavelength band may be narrowed by an optical filter or the like.

In general, the beams from these light sources are not parallel beams, but they diverge in any direction at a certain angle. Accordingly, if the beams are converged by a lens, portions with a lower energy density are formed in the periphery of the converged point, whereby the working precision is impaired. In a process of smoothing the surface, this impairment of the working precision may be reduced by conducting a countermeasure such as a scanning of the work piece. In other processes such as a cutting process, however, the impairment of the working precision produces a drawback that the cut edge is sagged. For a usual purpose, the drawback is not regarded as a serious problem. However, in the case where the working is performed with a precision of the order of submicron, it is necessary to make the beams parallel.

As a method of making excimer laser beams parallel, the laser beams may be oscillated through resonance using a resonance mirror under unstable conditions. If the divergent angle of the laser beams when oscillated from a laser oscillator is reduced from a normal value of about 1 to 3 mrad to a value of $5 \times 10^{-1}$ mrad or less, the convergency by a lens can be enhanced, so that an angle formed by the cut face and the diamond surface is sharp. This is effective in improving the flatness of the cut face. It is difficult for the divergent angle to be set smaller than $10^{-2}$ mrad. Even if such a small angle is realized, the working will not attain much more effect which matches the effort to overcome the difficulty.

Moreover, it is effective to narrow a wavelength band, when a very precise working in the order of 1 μm or less is required. As a method of narrowing the band, a method using an etalon, or an injection lock system may be used. Regarding the degree to which the oscillation wavelength band is narrowed, it is necessary that the half-width of the band width is not less than $10^{-4}$ nm and less than 1 nm. In the case where the half-width is 1 nm or more, it is insufficient to perform such a precise working. The case where the half-width is less than $10^{-4}$ nm, is not suitable for the working, because a sufficient energy required to the working cannot be obtained.

According to the present invention, even when the surface of the diamond is uneven or the diamond has a shape of a curved thin plate, diamond can be flattened and/or smoothed in the following manner. That is, the diamond surface which is uneven or curved is partly covered with a layer of particles having a particle diameter of 0.5 to 10 μm and made of a material such as alumina, silicon nitride or the like. The diamond surface which is partly covered with the particle layer is irradiated with light having a wavelength in the range of 190 nm to 360 nm. Alternatively, the diamond surface is partly covered with a layer of liquid such as silicon oil. The diamond surface which is partly covered with the liquid layer is irradiated with light having a wavelength in the range of 190 nm to 360 nm.

The layer of particles such as alumina or silicon nitride particles, or of a liquid such as silicon oil will not transmit light in the range of 190 nm to 360 nm. Therefore, the portion of the diamond which is covered with the particle or liquid is not ground even when the light is incident thereon. Only the exposed portion of the diamond which is not covered with the particle or liquid is ground, resulting in that an entirely flat and smooth diamond surface is obtained. In order to shield light, an absorption coefficient of $1 \times 10^2$ cm$^{-1}$ or more is required.

A smoother worked face is obtained when diamond immersed in an aqueous solution of acid or alkali or in a liquid such as alcohol or ketone is irradiated with light in the range of 190 nm to 360 nm. It seems that H ions, OH ions, or oxygen atoms contained in alcohol, ketone or the like participate in the decomposition of the diamond surface which is irradiated with light, and therefore the diamond surface is worked to be more smoother than the case without these ions.

In the process of converging light and irradiating a diamond surface with the light, a lens or a total-reflection mirror may be used. The useful lens and mirror include a convex lens and concave mirror for converging light to a spot. When light is to be linearly converged, a cylindrical convex lens and/or a cylindrical concave mirror may be used. Moreover, by combining concave lenses or convex mirrors, light may be converted into parallel beams or beams having a small converging angle which is closer to the parallel beams. The energy density of the incident light can be controlled by the converging conditions of light.

The process of working diamond may be advanced by scanning the diamond with light. When a flat surface of diamond is to be worked, however, it is preferred that the work piece is driven in parallel in order to precisely work the diamond. In the case where a three-dimensional work piece is worked so as to have a smooth surface, it is necessary to drive both the light and the work piece. When diamond is to be cut, in view of the relationship between the energy density and the perpendicularity of the cut face, it is effective to perpendicularly irradiate the face to be cut with light. When the surface is to be smoothed, the smoothness is affected by the angle of the incident light.

In other words, there exits an optimum condition for every case, depending on the relationship among the energy density, the area to be irradiated, i.e., to be worked, and the surface conditions. The energy density can also be changed by adjusting the focal length of the lens or mirror for converging and the location of the work piece with respect to the focal point. If the energy density is lower than $10^{-1}$ J/cm$^2$ or 10 W/cm$^2$, the energy conditions for decomposing diamond are not satisfied. If the energy density exceeds $10^5$ J/cm$^2$ or $10^{11}$ W/cm$^2$, portions of diamond other than the portion to be worked receive an adverse effect such as deterioration.

Generally, an excimer laser beam has a square section having a size of about 10 mm×20 mm. The energy profile in the beam section is not uniform, but is distributed. In the energy distribution, the energy level is low at the peripheral portions, and has a relatively gentle peak at the center portion. The nonuniformity of the energy level produces reduced working precision of the worked face, such as unevenness. That is, even when light is converged by a lens, the energy distribution is maintained, resulting in the nonuniform face of the worked diamond.

The inventors have found that if laser light is linearly converged by a cylindrical lens and a diamond surface is irradiated with the light, the worked diamond is uniform and flat and the cut face is worked with high precision and at a high speed. Although the reason for this has not been clarified, it seems that conditions for eliminating the above problems are produced by converging light in one direction. When a growth face of vapor-phase synthetic diamond having large unevenness is to be smoothed, the width of the line into which the light is linearly converged and the incident angle significantly affect the working.

It is preferable to set the line width to be 10 μm or more. If the line width is less than 10 μm, the worked face has linear unevenness. Regarding the incident angle, an optimum value varies depending on the surface conditions such as unevenness and the angle of the slope of projection constituting the unevenness. In the case of vapor-phase synthetic diamond which is synthesized under normal conditions, an incident angle of light in the range of 40 to 85 degrees with respect to the normal of the diamond surface provides a worked surface smoother than that obtained when light is perpendicularly incident. If the incident angle is 45 degrees or less, a more preferable surface can be obtained.

Depending on conditions of the excimer laser, nonuniformity may occur at both ends of a portion worked by linearly converging light. In such a case, however, a more uniform worked face can be obtained by shielding the both end portions of the laser. Furthermore, it has been found that, when the variation in energy distribution in the section of laser beam is suppressed to 10% or less, the distribution does not substantially affect the working precision. As a method of averaging the energy level, known are a method using a homogenizer, and a method in which only the central portion having a relatively uniform energy distribution is extracted by using a mask or the like.

It has been found that the process of working diamond is affected also by the atmosphere. It seems that the light irradiation produces a structural change from diamond to graphite or the like, in addition to the decomposition of the diamond. Therefore, it is effective to conduct the working in an inert gas atmosphere of helium or the like or in a vacuum in which no light absorption occurs. Also in an oxygen atmosphere or an oxidizing atmosphere, the reaction of diamond or graphite with oxygen is accelerated so as to attain excellent effects on the working. On the other hand, since $F_2$ excimer laser and SOR generate light beams in the vacuum ultraviolet range, the working is required to be performed in the high vacuum while converging light with a total-reflection mirror.

When pulsed laser is used, the working speed is increased in proportion to the frequency of the pulse. As an apparatus for generating such laser beams, a laser oscillator having a high-repetition property is preferably used. Also, the etching rate tends to increase as the energy density is increased. When diamond is to be cut, therefore, it is preferable to use an apparatus which can generate light of high energy.

Examples of the present invention will now be described.

EXAMPLE 1

Vapor phase synthetic diamond was cut with excimer laser. The vapor-phase synthetic diamond was a thin plate having a thickness of 350 μm and a size of 50 mm×50 mm. The excimer laser was injection lock-type ArF excimer laser. In the amplification side of the laser, an unstable resonator was provided so that the laser light was highly paralleled. The oscillation wavelength was 193 nm, and the half-width was narrowed to 5/1000 nm. The laser light was converged to an area having a size of 10 μm×10 μm by using a combination of convex and concave lenses of synthetic quartz. The surface of the diamond to be worked was irradiated in the air with the laser light.

The energy density in this example was $10^5$ J/cm$^2$. The pulse frequency was 200 Hz. The incident angle was set so that the incident light was parallel to the normal of the diamond face. The diamond was driven perpendicularly with respect to the laser light. The laser light was scanned along the width of 50 mm and at a speed of 0.2 mm/sec, so that the cutting was achieved after 250 seconds. The cut face was examined with the aid of an electron microscope, and no change in morphology around the cut face was observed. Moreover, the cut face itself was an extremely smooth surface with no formation of graphite.

EXAMPLE 2

Natural type IIa diamond was cut by using excimer laser, as shown in FIG. 1. The diamond 3 had a thickness of 2 mm and a size of 2 mm×2 mm. The excimer laser 1 was ArF excimer laser. The laser light was converged to an area of 2 mm×10 μm by using a cylindrical convex lens 2 of synthetic quartz. With the converged laser light, a surface of the diamond 3 to be cut was irradiated in a nitrogen gas stream. The energy density in this example was $10^4$ J/cm$^2$. The pulse frequency was set to be 250 Hz.

The incident angle was set so that the incident light was parallel to the normal of the diamond face. The diamond 3 was driven perpendicularly with respect to the laser light. The cutting of the piece with a thickness of 2 mm required a period of 30 seconds. The cut face was examined with the aid of an electron microscope, and no change in morphology around the cut face was observed. Moreover, the cut face itself was an extremely smooth surface with no formation of graphite.

EXAMPLE 3

Figure 2:
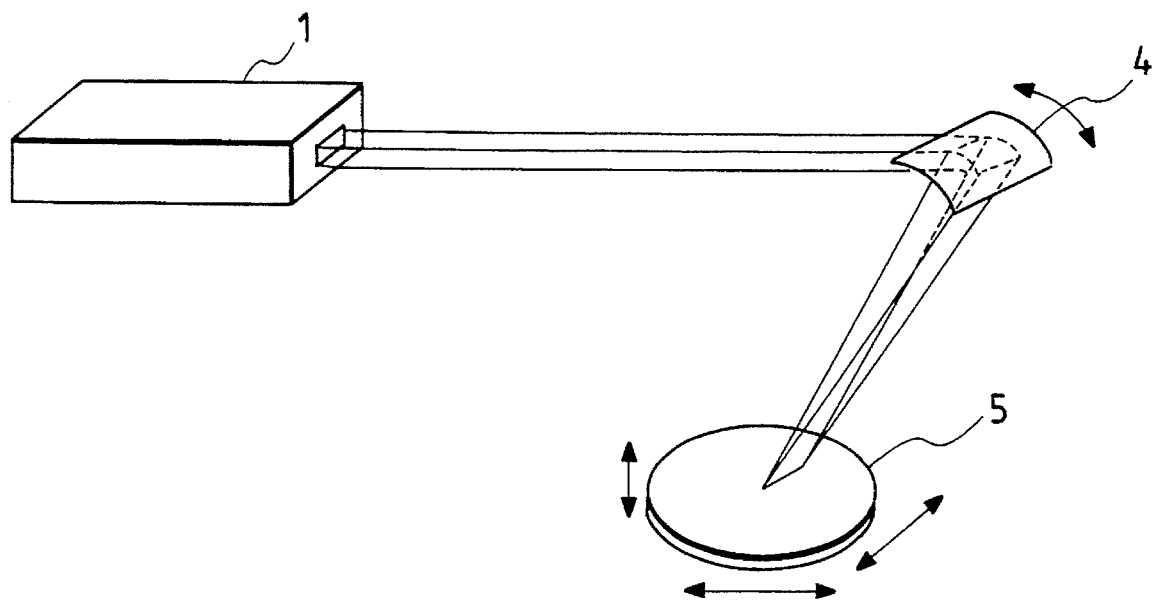
FIG. 2 is a diagram showing the concept of another example of an apparatus for performing the method of the invention.

A surface of vapor-phase synthetic diamond was smoothed by using excimer laser 1, as shown in FIG. 2. The vapor-phase synthetic diamond 5 had a disk-like shape having a thickness of 350 μm and a diameter of 50 mm. The surface of the diamond was the one on which pyramid-like projections having a height of about 30 μm were formed.

The excimer laser 1 was ArF excimer laser.

The laser light was converged to an area having a size of 10 mm×10 μm by using a concave mirror 4 having a cylindrical face. With the converged laser light, the surface of the diamond to be worked was irradiated in a nitrogen gas stream. The energy density in this example was $5\times10^2$ J/cm$^2$. The pulse frequency was set to be 200 Hz. The incident angle was set to be 45 degrees with respect to the normal of the diamond face. The diamond 5 was driven so that the laser light scans the surface of the diamond. Reciprocating scan along the width of 50 mm and at a speed of 0.5 mm/sec was performed five times, so that the total scanning period was 500 seconds. The surface was examined with the aid of an electron microscope, and the surface was found to be smooth and had almost no unevenness. An average value of the surface roughness Ra was 0.1 μm or less. Moreover, the formation of graphite on the worked face was not observed.

EXAMPLE 4

A surface of vapor-phase synthetic diamond was smoothed by using excimer laser. The vapor-phase synthetic diamond was a thin plate having a thickness of 350 μm and a size of 50 mm×50 mm. The surface of the diamond was the one on which pyramid-like projections having a height of about 30 μm were formed. The excimer laser was XeF excimer laser. At the amplification side of the laser, an unstable resonator was provided so that the laser light was highly paralleled, and the use of a homogenizer reduced the variation in energy distribution to be 9% at the most.

The laser light was converged to an area having a size of 10 mm×20 μm by using a combination of cylindrical convex and cylindrical concave lenses of synthetic quartz. With the converged laser light, the surface of the diamond to be worked was irradiated in the air. The energy density in this example was 10 J/cm$^2$. The pulse frequency was set to be 200 Hz. The incident angle was set so that the incident laser light was perpendicular to the diamond face. The diamond was driven perpendicularly with respect to the laser light. Reciprocating scan along the width of 50 mm and at a speed of 0.5 mm/sec was performed five times, so that the total scanning period was 500 seconds. The surface was examined with the aid of an electron microscope, showing that the surface was an extremely smooth one with no formation of graphite.

EXAMPLE 5

A surface of vapor-phase synthetic diamond was smoothed by using SOR. The vapor-phase synthetic diamond was a thin plate having a thickness of 350 μm and a size of 50 mm×50 mm. The surface of the diamond was the one on which pyramid-like projections having a height of about 30 μm were formed. The SOR light was converged by a total-reflection mirror. Then, the surface of the diamond to be worked was irradiated in vacuum with the converged SOR light. The energy density in this example was $10^{10}$ W/cm$^2$. The incident light was set so that the incident light was parallel to the normal of the diamond face. The diamond was driven perpendicularly with respect to the laser light. The shaved or ground face was examined with the aid of an electron microscope, and no change in morphology around the shaved face was observed. Moreover, the shaved face itself was an extremely smooth surface with no formation of graphite.

EXAMPLE 6

A surface of vapor-phase synthetic diamond was ground by using excimer laser. The vapor-phase synthetic diamond was a plate having a thickness of 350 μm and a size of 25 mm×25 mm. The surface roughness Ra was 4 μm. The excimer laser was KrF excimer laser having an oscillation wavelength of 248 nm. The laser light was converged to an area having a length of 25 mm and a width of 100 μm by using a combination of cylindrical convex and cylindrical concave lenses of synthetic quartz. The diamond surface was irradiated with the converged laser light while blowing an oxygen gas to the surface. The energy density in this example was 10 J/cm$^2$. The pulse frequency was set to be 100 Hz. The incident angle was set so that the incident light travels along the normal direction of the diamond face. The diamond was scanned along the length of 25 mm four times in a direction perpendicular to the laser light and at a speed of 2 mm/sec. After the working, the thickness of the work piece was measured. The measured thickness was 200 μm. Moreover, the surface roughness Ra was improved to be 0.2 μm.

EXAMPLE 7

The (111) plane of synthetic type Ib diamond was worked by using excimer laser. The diamond as-grown had a thickness of about 5 mm and a size of about 10 mm×10 mm. In the seed face side, a so-called inclusion of a solvent metal was observed. The seed face and the growth face were smoothed by using the excimer laser which was ArF excimer laser. By the mask image method, the laser light was converged to an area of 10 mm×10 μm by using a cylindrical convex lens of synthetic quartz. With the converged laser light, the diamond surface was irradiated in a helium gas stream. The energy density in this example was 30 J/cm$^2$. The pulse frequency was set to be 100 Hz. The incident angle was set so that the incident light is perpendicular to the diamond face. The diamond was driven perpendicularly with respect to the laser light. In the seed face side, the scanning was reciprocated 10 times, so that a portion of 500 μm including the inclusion was ground. A time period required for one reciprocation was 10 minutes. In the growth face, one reciprocation of the scanning was made, thereby smoothing the face. As a result, a flat single-crystal diamond plate having a thickness of about 4 mm and with no inclusion was obtained.

Comparative Example 1

The (111) plane of synthetic type Ib diamond was worked by mechanical abrasion (scaife abrasion). The diamond as grown had a thickness of about 5 mm and a size of about 10 mm×10 mm. In the seed face side, a so-called inclusion of a solvent metal was observed. The seed face and the growth face were flattened by scaife abrasion. In scaife abrasion, loose diamond abrasives are scattered on an iron work table rotating at a high speed, and then diamond to be worked is pressed to the table, thereby working the diamond. In the scaife abrasion, the temperature rises up to several hundreds of degrees Celsius.

The (111) plane is the hardest plane in diamond. Therefore, it took 245 hours to remove a portion of 0.5 mm of the face in the seed face side. In this example, a crack from the inclusion occurred. It was considered that the crack was caused by the thermal influence. Moreover, it took several days to grind a portion of several micrometers in the growth face side. Furthermore, the ground face was curved. This was considered to be caused by the deformation of the worked face.

Comparative Example 2

Vapor phase synthetic diamond was ground with a metal-bond diamond grinder. The vapor-phase synthetic diamond was a self-supporting plate having a size of 25 mm×25 mm and a thickness of 500 μm. The diamond was pressed to the rotating face of the grinder. It took 313 hours to grind a portion having a thickness of 100 μm. During this grinding process, the grindstone was exchanged five times. The ground face was observed to be curved.

EXAMPLE 8

Vapor phase synthetic diamond was flattened and smoothed by using excimer laser. The vapor-phase synthetic diamond was a thin plate which had a thickness of 500 μm and a size of 50 mm×50 mm, and which was largely curved. The degree of curve, i.e., camber, which was represented by the difference between the highest point of the face and the lowest point, was 100 μm. The surface of the diamond was the one on which pyramid-like projections having a height of about 30 μm were formed. The diamond was rested in a frame of about 50 mm×50 mm on a flat plate. The frame contained the suspension including particles of alumina (aluminum oxide) which had a size of about 0.5 μm to 10 μm and were suspended in methanol. It was allowed to stand or be heated in order to vaporize the methanol.

After the suspension was dried to be solidified, the frame was removed. Then, the alumina was shave off in parallel until the diamond face appeared. The whole was flattened by using the excimer laser so that the flattening and smoothing for the diamond were conducted. The excimer laser was XeCl excimer laser having a wavelength of 308 nm. The laser light was converged by a cylindrical convex lens of synthetic quarts, to an area having a length of 30 mm and a width of 100 μm. With the converged laser light, the diamond surface to be worked was irradiated while blowing an oxygen gas to the surface. The average energy density in this example was 5 J/cm$^2$. The pulse frequency was set to be 100 Hz.

The incident angle was set to be 75 degrees with respect to the normal of the diamond face. The diamond was driven in parallel with the laser light. Reciprocating scan was made twice along the width of 50 mm at a speed of 1 mm/min. After setting the upside down, the laser light was scanned in the same manner. Thereafter, the alumina was removed by ultrasonic cleaning. When the surface was observed with the aid of an electron microscope, it was found that the worked face was flat and had almost no unevenness. The surface roughness Ra was 0.2 μm. On the worked face, there was no formation of graphite.

In place of alumina particles, one or more materials which have an absorption coefficient of $1 \times 10^2$ cm$^{-1}$ or more for the incident light and which are selected from a group consisting of silicon nitride, silicon carbide, silicon oxide, aluminum nitride, boron nitride, boron oxide, titanium oxide, magnesium oxide, calcium oxide, iron oxide, zirconium oxide, yttrium oxide, diamond, a compound thereof, and the like may be used. In any of these alternatives, the same effects can be attained.

EXAMPLE 9

Vapor phase synthetic diamond was flattened and smoothed by using excimer laser. The vapor-phase synthetic diamond was a thin plate which had a thickness of 500 μm and a size of 50 mm×50 mm, and which was largely curved. The degree of curve, i.e., camber, which was represented by the difference between the highest point of the face and the lowest point, was 100 μm. The surface of the diamond was the one on which pyramid-like projections having a height of about 30 μm were formed.

The diamond plate was fixed on a work piece table, and then placed in a vessel containing silicone oil which does not transmit ultraviolet light. The work piece table was designed so that it could be controlled to move vertically in the vessel. The excimer laser was KrF excimer laser having a wavelength of 248 nm. The laser light was converged to an area having a length of 50 mm and a width of 100 μm through an optical system in which cylindrical convex and concave lenses of synthetic quartz are combined. With the converged laser light, the diamond surface to be worked was irradiated while blowing a helium diluted oxygen gas to the surface. The average energy density in this example was 3 J/cm$^2$. The pulse frequency was set to be 100 Hz.

Reciprocating scan was made three times along the width of 50 mm at a speed of 1 mm/min. The incident angle was set to be 60 degrees with respect to the normal of the diamond face. The diamond was driven so that the laser light scans the surface of the diamond. In every scan, the work piece table was elevated by about 10 to 20 μm. At the time when the curved portion of 100 μm was removed, the upside of the work piece face was set down. Then, the scanning of the laser light was performed in the same manner. Thereafter, the silicone oil was washed away. When the surface was observed with the aid of an electron microscope, it was found that the worked face was a smooth surface with almost no unevenness. The surface roughness Ra was 0.2 μm. Moreover, on the worked face, there was no formation of graphite. In place of silicon oil, even when a liquid such as benzene, acetone, ethyl acetate, propylene carbonate, toluene, or the like which is not transparent to the excimer laser is used, the same effects can be attained.

EXAMPLE 10

A surface of vapor-phase synthetic diamond was partly ground by using excimer laser, so as to form a recess portion. The vapor-phase synthetic diamond was a smoothed thin plate having a thickness of 350 μm and a size of 50 mm×50 mm. The excimer laser was XeF excimer laser. By the mask image method, the laser light was converged to an area of 10 mm×20 μm by using a combination of cylindrical convex and concave lenses of synthetic quartz. With the converged laser light, the diamond surface to be worked was irradiated while spraying acetone on the surface.

The energy density in this example was 20 J/cm$^2$. The pulse frequency was set to be 80 Hz. The incident angle was set so that the laser light was incident perpendicularly on the diamond face. The diamond was driven perpendicularly with respect to the laser light. Reciprocating scan was performed four times along a width of 10 mm at a speed of 3 mm/min. As a result, a groove of a size of 10 mm×10 mm and a depth of 80 μm was formed at the center of the diamond surface. When the surface was observed with the aid of an electron microscope, it was found that the face was a smooth surface with almost no unevenness. The surface roughness Ra was 0.2 μm. Moreover, on the surface, there was no formation of graphite. A semiconductor laser device was buried in this recessed diamond plate, and then driven to oscillate, with the result that excellent cooling characteristics were attained.

EXAMPLE 11

A surface of vapor-phase synthetic diamond was ground in an aqueous solution of hydrochloric acid. The vapor-phase synthetic diamond was a thin plate having a thickness of 350 μm and a size of 25 mm×25 mm. The diamond had a surface on which pyramid-like projections having a height of about 30 μm were formed.

Excimer laser which was KrF excimer laser having an oscillation wavelength of 248 nm was used. The laser light was converged to an area having a length of 25 mm and a width of 100 μm by using a combination of cylindrical convex and concave lenses of synthetic quartz. With the converged laser light, the diamond surface to be worked was irradiated. The energy density in this example was 10 J/cm$^2$. The pulse frequency was set to be 100 Hz. The incident angle was set so that the incident light was parallel to the normal of the diamond face.

The diamond was driven perpendicularly with respect to the laser light. When the ground section was examined with the aid of an electron microscope, it was observed that the face was smooth and had almost no unevenness. The surface roughness Ra was improved up to 0.1 μm. Moreover, on the worked face, there was no formation of graphite. The conditions of the ground section were better than those obtained in Example 10 described above. The thickness of diamond which was ground by one scan was 40 μm.

In place of hydrochloric acid, nitric acid, acetic acid, sulfuric acid, phosphoric acid or the like may be used as the acid for the aqueous solution, while attaining the same effects. Alternatively, an aqueous solution of alkali such as potassium hydroxide, sodium hydroxide, ammonia or the like may be used, resulting in that the same effects can be attained. It is suitable to set the density of acid or alkali in the aqueous solution to be 0.5 to 10%. If the density is less than 0.5%, the effects cannot be attained. If the density is more than 10%, the aqueous solution is not transparent to the excimer laser.

EXAMPLE 12

A surface of vapor-phase synthetic diamond was ground in a methanol liquid. The vapor-phase synthetic diamond was a thin plate having a thickness of 350 μm and a size of 25 mm×25 mm. The diamond had a surface on which pyramid-like projections having a height of about 30 μm were formed.

Excimer laser which was KrF excimer laser having an oscillation wavelength of 248 nm was used. The laser light was converged to an area having a length of 25 mm and a width of 100 μm by using a combination of cylindrical convex and concave lenses of synthetic quartz. With the converged laser light, the diamond surface to be worked was irradiated. The energy density in this example was 10 J/cm$^2$. The pulse frequency was set to be 100 Hz. The incident angle was set such that the incident light was parallel to the normal of the diamond face.

The diamond was driven perpendicularly with respect to the laser light. When the ground face was examined with aid of an electron microscope, it was observed that the face was smooth and had almost no unevenness. The surface roughness Ra was improved up to 0.1 μm. Moreover, on the worked face, there was no formation of graphite. The conditions of the ground face were better those that obtained in Example 10 describe above. The thickness of diamond which was ground by one scan was 35 μm.

In place of methanol, an organic material containing oxygen, e.g., ethanol and other alcohols, ketones such as acetone, any type of ether, or the like may be used, with the result that the same effects can be attained. Instead of placing the work piece diamond in a liquid, the diamond may be worked while spraying one of the organic materials, or worked in the vapor of the organic material.

The present invention can provide a method of working diamond with high efficiency and high precision. According to the invention, diamond can be more widely applied to various fields in which diamond has not been conventionally used because, in the prior art, problems of diamond such as hardness of diamond and relatively low resistance against oxidization cause the working of diamond to be impracticable or very expensive. Moreover, the invention provides a method of three-dimensionally working diamond with high precision.

What is claimed is:

1. A method of working diamond by irradiating a surface of said diamond with light, wherein said light has a wavelength of 360 nm or less, wherein an energy density of said light with which said diamond surface is irradiated is in the range of 10 W/cm$^2$ to $10^{11}$ W/cm$^2$, wherein said light is pulsed laser light, and wherein a divergent angle of said laser light when oscillated from a laser oscillator is in the range of $10^{-2}$ mrad to $5\times10^{-1}$ mrad.

2. A method of working diamond by irradiating a surface of said diamond with light, wherein said light has a wavelength in the range of 190 nm to 360 nm, wherein an energy density of said light with which said diamond surface is irradiated is in the range of 10 W/cm$^2$ to $10^{11}$ W/cm$^2$, wherein said light is pulsed laser light, and wherein a divergent angle of said laser light when oscillated from a laser oscillator is in the range of $10^{-2}$ mrad to $5\times10^{-1}$ mrad or less.

3. A diamond working method according to claim 2, wherein an energy density per one pulse of said pulsed laser light with which said diamond surface is irradiated is in the range of $10^{-1}$ J/cm$^2$ to 106 J/cm$^2$.

4. A diamond working method according to claim 2, wherein the half-width of an oscillation spectrum of said laser light is in the range of $10^{-4}$ nm to 1 nm.

5. A diamond working method according to claim 2, wherein a variation in energy in a beam section of said laser light is up to 10% or less.

6. A diamond working method according to claim 2 or 5 wherein said pulsed laser light is converged to a line having a width of 10 μm or more by a cylindrical lens or a cylindrical mirror, to irradiate said diamond surface.

7. A diamond working method according to claim 2 or 5, wherein said pulsed laser light is converged by a cylindrical lens or a cylindrical mirror, to irradiate said diamond surface.

8. A diamond working method according to claim 7, wherein, when said diamond surface is irradiated with said pulsed laser light which is converged by said cylindrical lens or said cylindrical mirror, an incident angle on said diamond surface is in the range of 40 to 85 degrees with respect to a normal of said diamond surface.

9. A method of working diamond by irradiating a surface of said diamond with light, wherein said diamond surface is covered with a layer of particles made of a material having a particle diameter of 0.5 to 10 μm and having an absorption coefficient of $1\times10^2$ cm$^{-1}$ or more, and said diamond surface covered with said particle layer is irradiated with light having a wavelength in the range of 190 nm to 360 nm, thereby grinding a portion of said diamond which is exposed from said particle layer.

10. A method of working diamond by irradiating a surface of said diamond with light, wherein said diamond surface is covered with a layer of particles made of one or more materials or of a compound of said materials, said materials being selected from a group consisting of aluminum oxide, silicon nitride, silicon carbide, silicon oxide, aluminum nitride, boron nitride, boron oxide, titanium oxide, magnesium oxide, calcium oxide, iron oxide, zirconium oxide, yttrium oxide, and diamond, said materials or compound having a particle diameter of 0.5 to 10 µm, and said diamond surface covered with said particle layer is irradiated with light having a wavelength in the range of 190 nm to 360 nm, thereby grinding a portion of said diamond which is exposed from said particle layer.

11. A method of working diamond by irradiating a surface of said diamond with light, wherein said diamond surface is covered with a layer of a liquid having an absorption coefficient of $1\times10^2$ $cm^{-1}$ or more for light having a wavelength in the range of 190 nm to 360 nm, and said diamond surface covered with said liquid layer is irradiated with light having a wavelength in the range of 190 nm to 360 nm, thereby grinding a portion of said diamond which is exposed from said liquid layer.

12. A method of working diamond by irradiating a surface of said diamond with light, wherein said diamond surface is covered with a layer of one liquid or of a mixture of two or more liquids, said liquid or liquids being selected from a group consisting of silicon oil, petroleum ether, hexane, benzene, acetone, ethyl acetate, propylene carbonate, and toluene, and said diamond surface covered with said liquid layer is irradiated with light having a wavelength in the range of 190 nm to 360 nm, thereby grinding a portion of said diamond which is exposed from said liquid layer.

13. A method of working diamond, wherein said diamond is placed in alcohol, ketone, or ether or, of a mixture of two or more of them, and then is irradiated with light having a wavelength in the range of 190 nm to 360 nm.

14. A method of working diamond, wherein said diamond is placed in an aqueous solution of acid or alkali, and then irradiated with light having a wavelength in the range of 190 nm to 360 nm.

15. A method according to claim 14, wherein said solution contains a compound selected from the group consisting of HCl, $CH_3COOH$, $H_2SO_4$, $P_2O_5 \cdot nH_2O$, NaOH, and $NH_3$, wherein a concentration of said compound in said solution is in the range of 0.5 wt % to 10 wt %, and wherein n is an integer.

16. A method according to claim 14, wherein said solution consists essentially of pure water.

17. A method of working diamond by irradiating a surface of said diamond with light, wherein said light has a wavelength of 190 nm to 360 nm, wherein an energy density of said light with which said diamond surface is irradiated is in the range of 10 $W/cm^2$ to $10^{11}$ $W/cm^2$, wherein said light is pulsed laser light, wherein a variation in energy in a beam section of said laser beam is not more than 10%, and wherein said pulsed laser light is converged by a cylindrical lens or a cylindrical mirror, to irradiate said diamond surface.

18. A method according to claim 17, wherein said pulsed laser light is converged to a line having a width of 10 µm or more by said cylindrical lens or a cylindrical mirror.

19. A method of working diamond by irradiating a surface of said diamond with light, wherein said light has a wavelength of 360 nm or less, wherein an energy density of said light with which said diamond surface is irradiated is in the range of $10^{-1}$ $J/cm^2$ to $5\times10^2$ $J/cm^2$, wherein said light is pulsed laser light, and wherein a divergent angle of said laser light when oscillated from a laser oscillator is in the range of $10^{-2}$ mrad to $5\times10^{-1}$ mrad.

20. A method of working diamond by irradiating a surface of said diamond with light, wherein said light has a wavelength in the range of 190 nm to 360 nm, wherein an energy density of said light with which said diamond surface is irradiated is in the range of $10^{-1}$ $J/cm^2$ to $5\times10^2$ $J/cm^2$, wherein said light is pulsed laser light, and wherein a divergent angle of said laser light when oscillated from a laser oscillator is in the range of $10^{-2}$ mrad to $5\times10^{-1}$ mrad.

21. A method according to claim 20, wherein the half-width of an oscillation spectrum of said laser light is in the range of $10^{-4}$ nm to 1 nm.

22. A method according to claim 20, wherein a variation in energy in a beam section of said laser light is up to 10%.

23. A method according to claim 20 or 22, wherein said pulsed laser light is converged to a line having a width of 10 µm or more by a cylindrical lens or a cylindrical mirror, to irradiate said diamond surface.

24. A method according to claim 20 or 22, wherein said pulsed laser light is converged by a cylindrical lens or a cylindrical mirror, to irradiate said diamond surface.

25. A method according to claim 24, wherein, when said diamond surface is irradiated with said pulsed laser light which is converged by said cylindrical lens or said cylindrical mirror, an incident angle on said diamond surface is in the range of 40 to 85 degrees with respect to a normal of said diamond surface.

* * * * *